June 26, 1945.      R. M. LYNN      2,379,167
LENS SYSTEM
Filed March 29, 1944      2 Sheets-Sheet 1

Inventor
Robert M. Lynn

Patented June 26, 1945

2,379,167

UNITED STATES PATENT OFFICE 2,379,167

LENS SYSTEM

Robert M. Lynn, Altadena, Calif.

Application March 29, 1944, Serial No. 528,564

1 Claim. (Cl. 88—57)

This invention relates to a lens system, and refers particularly to a lens system which has been designed for use on a gun sight on aircraft.

Certain gun sights used upon airplanes require the focusing of an image of an illuminated reticle at a distance of a number of thousands of feet from the plane. For sighting purposes a large image is desired and because of the space requirements in aircraft design the gun sight must be small in physical dimensions. These factors have led to the demand for a new gun sight having a lens system with an aperture or F number of approximately .069. The aperture opening of the lens system of the order of about 2⅜ inches is desirable. The reticle desired for such a gun sight is a ring-shaped reticle with a spot in the center of the ring. The lens system must be corrected for spherical and chromatic aberration at such center spot and at the ring of the recticle employed.

It is a general object of the present invention to provide a lens system which will satisfy the above requirements. So far as I am aware, there has not been heretofore produced a lens system having an F number of the order specified for use with a reticle of the type specified. The lens system of the present invention permits the production of a gun sight for aircraft which may be installed in the space where previous gun sights could not be installed, and moreover the lens system used in my invention can be produced out of readily available glass.

I have discovered that these properties may be attained by the lens system herein described, which comprises a first member in the form of a deep meniscus; the second member of the lens system is a cemented doublet; and the third member of the system is a double convex lens. The properties of the glass employed in the lens, that is the refractive index and Nu value, are critical to the F number and the correction of chromatic and spherical aberrations, and likewise the radii of curvature of the lenses is critical to the desired aperture number and correction of spherical and chromatic aberrations. I have, therefore, hereafter described with reference to the accompanying drawings, the exact properties of the preferred lens system of the present invention.

It will be understood, however, by those skilled in the art, that some variations in the properties specified may be permitted in practice without departing from the objects of the present invention.

Figure 1:
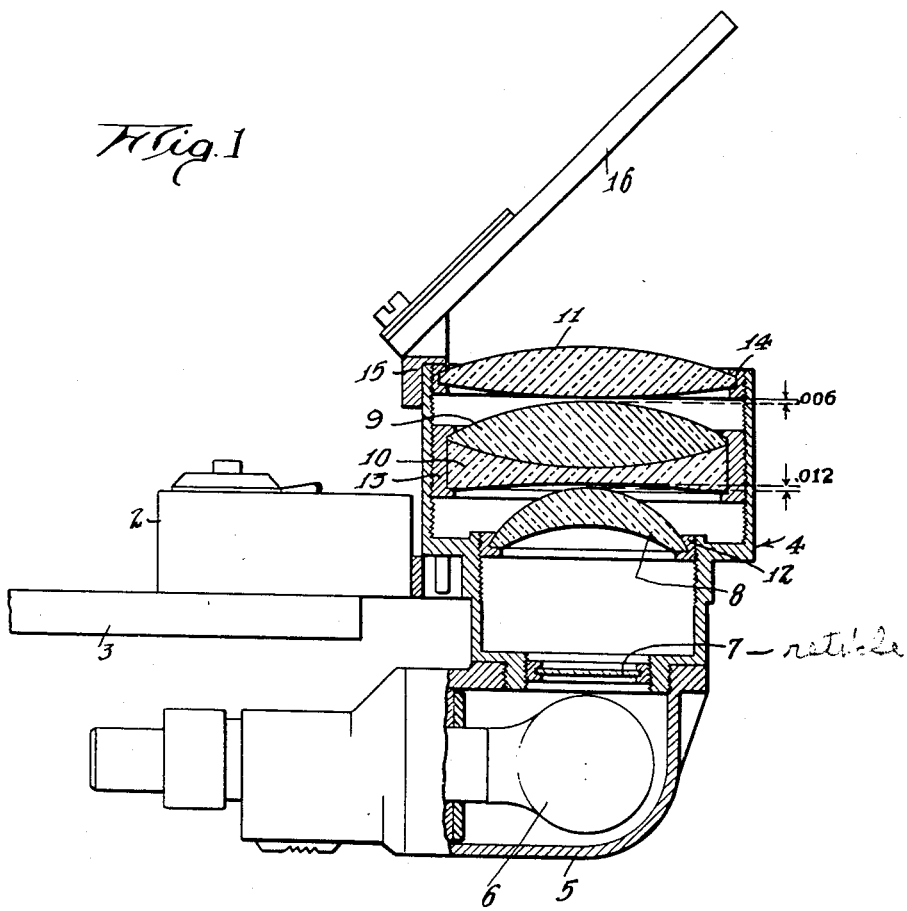
Figure 1 is a vertical section through a gun sight, including the lens system of the present invention.

Referring to the drawings, I have shown an aircraft gun sight which comprises a bracket 2 by means of which the gun sight may be fixed to a support 3. The bracket 2 holds the casing 4 in which the lens system of the present invention is housed. Below the casing 4 there is a housing 5 for an incandescent lamp 6. The incandescent lamp 6 illuminates a reticle marked on a silvered plate 7. The lower member of the lens system comprises a deep meniscus lens 8. The second member of the lens system is the cemented doublet which includes the double convex lens 9 and the double concave lens 10. The top member of the lens system comprises a double convex lens 11. These lenses are held in retaining rings 12, 13 and 14 in the casing 4 and the retaining rings are adjustable in the casing in order to provide the requisite spacing. Above the lens system there is provided a support 15 for a transparent plate 16, set at a 450° angle.

The particular reticle employed is a circular ring with a center spot and in use of the gun sight an image on this reticle is focused about 3,000 feet in advance of the aircraft and is presented to the pilot or gunner when sighting the target through the plate 16.

The lens 8 is indicated as a deep meniscus lens having a bottom curvature of 1.549 and an upper curvature of 0.922 inch. This lens should have a refractive index of about 1.511 and a Nu of 63.5. These properties are found in certain borate silicate crown glass.

The cemented doublet includes the dispersive lens 10 which is indicated as double concave in form, and an upper collecting lens 9 which is indicated as double convex. These properties are obtained in flint glass. The rear curvature is 9.291 inches and the common curvature is 4.090 inches radii. The double convex lens 9 has a preferable refractice index of 1.511, a Nu value of 63.5, and these properties are obtainable in borate silicate crown glass. The radii of the top surface of the lens 8 is 1.927 inches. The same tolerances are permitted as in the case of the lens 9.

The upper lens 11 of the system possesses a refractive index of 1.517, Nu value of 64.5, and these properties are obtainable in borate silicate crown glass. The rear curvature radius is 15.107 and the front curvature is 3.794 inches.

Figures 2, 3, 4:
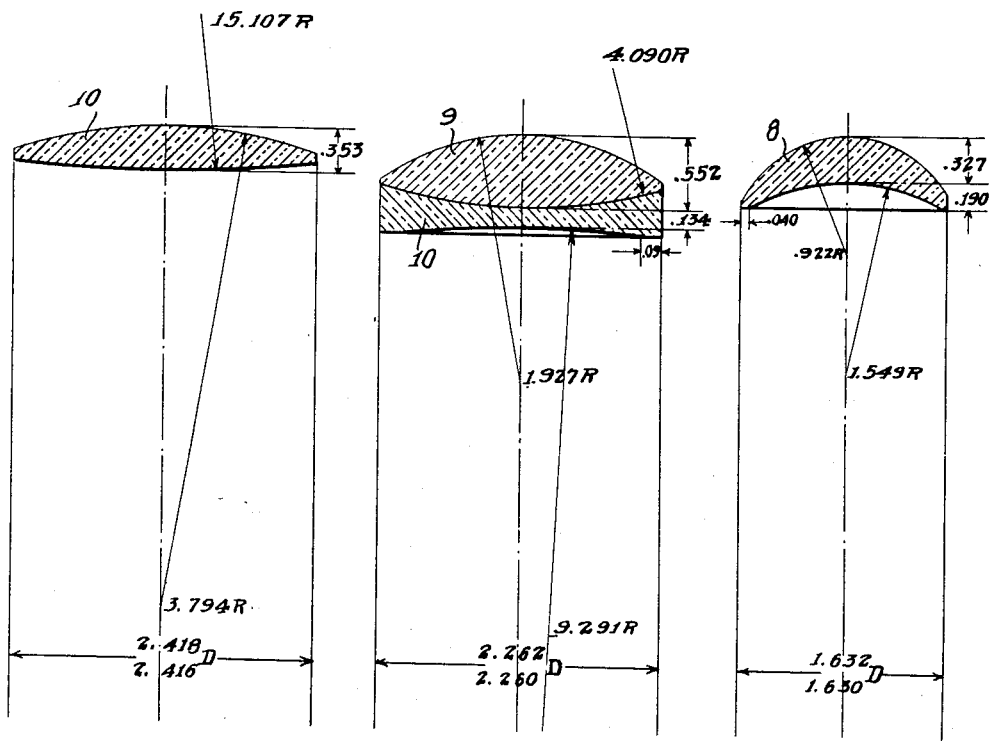
Figures 2, 3 and 4 are sections through the separate members of the lens system.

The thicknesses of the lenses are indicated in the drawings in Figures 2, 3 and 4, and the separation of the lenses in Figure 1; that is, the thickness of the lens 8 is 0.327 inch, lens 9, 0.552 inch, lens 10, .0134 inch, lens 11, 0.353 inch. The air space between lenses 8 and 10 is .0122 and between lenses 9 and 11, 0.006 inch.

By means of the present invention the space requirement for gun sights on aircraft is greatly reduced.

Having described my invention, I claim:

A lens system corrected for spherical and chromatic aberrations and having an F number of about 0.69 comprising a deep meniscus member closely spaced to a doublet, the concavity of the meniscus facing away from the doublet, the doublet being in turn closely spaced to a double convex collective member, the refractive indexes of the meniscus, the dispersive lens of the doublet, the collective lens of the doublet, and the final collective lens, being respectively, 1.511, 1.649, 1.511 and 1.517, the radii of the meniscus being 1.549, 0.922, the radii of the doublet being 9.291, 1.927, and 4.090, and the radii of the collective lens being 3.794 and 15.107, the Nu value of the meniscus, dispersive lens of the doublet, the collective lens of the doublet, and final collective member being, respectively, 63.5, 33.8, 63.5 and 64.5, and the actual separation between the meniscus and the doublet being .012 inch and between the doublet and final collective lens being .006 inch.

ROBERT M. LYNN.